United States Patent [19]

Takahashi et al.

[11] Patent Number: 5,671,104
[45] Date of Patent: Sep. 23, 1997

[54] SYSTEM AND METHOD FOR LOCKING A DISK ACTUATOR IN VERTICAL AND HORIZONTAL DIRECTIONS

[75] Inventors: Kohji Takahashi, Sagamihara; Hiroshi Matsuda, Zama; Keishi Takahashi, Fujisawa, all of Japan

[73] Assignee: International Business Machines Corporation, Armonk, N.Y.

[21] Appl. No.: 582,292

[22] Filed: Jan. 3, 1996

[30]  Foreign Application Priority Data

Feb. 17, 1995 [JP] Japan ................... 7-029810

[51] Int. Cl.$^6$ ............................ G11B 5/54
[52] U.S. Cl. ............................ 360/105
[58] Field of Search ................... 360/105, 106

[56]  References Cited

U.S. PATENT DOCUMENTS

| | | | |
|---|---|---|---|
| 4,881,139 | 11/1989 | Hasebrouck | 360/105 |
| 5,448,435 | 9/1995 | Nakazawa | 360/105 |
| 5,495,376 | 2/1996 | Wasson | 360/105 |
| 5,523,910 | 6/1996 | Alten | 360/105 |
| 5,528,437 | 6/1996 | Mastache | 360/105 |

FOREIGN PATENT DOCUMENTS

| | | | |
|---|---|---|---|
| 4-149875 | 5/1992 | Japan | G11B 21/22 |
| 5-128754 | 5/1993 | Japan | G11B 21/02 |

*Primary Examiner*—A. J. Heinz
*Attorney, Agent, or Firm*—Douglas R. Millett; Noreen A. Krall

[57]  ABSTRACT

A disk drive comprises a disk recording medium; an actuator traveling on the surface of the disk recording medium; a lock device vertically movable for locking the actuator when located upward or for releasing the actuator when located downward, composed of an elastic plate spring; a first magnetic-field supply for latching the lock device to the lower position by the action of a first magnetic force; a second magnetic-field supply for latching the lock device to the upper position by the action of a second magnetic force; and a lock device motor to move the lock device to the upper position when a first current supplied or as to move the lock device to the lower position when the second current different from the first current is supplied.

7 Claims, 2 Drawing Sheets

SYSTEM AND METHOD FOR LOCKING A DISK ACTUATOR IN VERTICAL AND HORIZONTAL DIRECTIONS

BACKGROUND OF THE INVENTION

1. Field of the Invention

The present invention refers to a disk drive actuator lock system and method and more particularly, to an actuator lock structure and method for preventing an actuator or the surface of a recording medium within the drive from being damaged due to a vibration or shock during nonoperation or during transport of the drive.

2. Description of the Prior Art

An actuator in a hard disk drive is used to position the transducer head over the recording disk surface. The actuator has a large number of optical instruments, electronic circuits, and other precision parts which allow it to achieve a rapid movement of the transducer head in a radial direction of the disk. Consequently, by locking the actuator at a predetermined position during carrying or transport of equipment or during nonoperation, the equipment is prevented from being destroyed by an external shock.

The durability of disk drive equipment to such a shock, or shock resistivity, is one of the performance features required of a disk drive. With an advance in the downsizing or portability of equipment, such disk drive units are being mounted into small-sized portable personal computers. Accordingly, the need for shock resistivity in a hard disk drive has increased. In the case of an external shock experienced during carrying the drive, generally, a large shock is applied for a short duration and may not be from one direction but from all directions, including from directions perpendicular to the disk surface. Thus, there is a great need for an improvement in the shock resistance due to the large shocks applied for a short duration during nonoperation operation of a drive unit as well as due to the rotational shocks.

Japanese Patent Application 294882/1991 is an example of a lock mechanism. This background art discloses a hard disk drive comprising a disk recording medium, a transducer head for transferring information to and from the recording medium, an actuator for moving the transducer head to a predetermined position on the recording medium, and a magnet for attracting a iron piece provided in a part of the actuator by the action of a magnetic field and latching it to a predetermined position. This background art further discloses that a coil is provided and a magnetic force is generated by applying current to the coil to release the fixation of the actuator.

However, while this background art has a relatively high shock resistivity to a shock in the direction parallel to the surface of a recording medium (horizontal) and in the same direction as the actuator travel, it exhibits a low resistivity to a large shock exerted for a short duration and a rotational shock including a vertical shock.

Another example of background art is Japanese Patent Application No. 273511/1990. This reference discloses that an actuator is fixed by vertically moving a latch member with the aid of a cam mechanism equipped with gears when moving a disk cartridge inserted in an information regeneration unit to the regeneration position with the aid of a slider bracket.

However, though this background art has a relatively high shock resistivity to the shock mentioned above, the latch mechanism becomes relatively large since the latch member is moved with the aid of the cam mechanism. Accordingly, such a mechanical mechanism is bulky and so does not suit itself to mounting in a small-sized portable personal computer.

Furthermore, when using such a mechanical mechanism, there is a possibility of dust generation occurring due to the friction of gears in the cam mechanism. Especially in a highly sealed magnetic disc drive, dust must be prevented from adhering to a recording medium and so it is undesirable to provide such a mechanical mechanism which may generate dust inside the unit.

SUMMARY OF THE INVENTION

It is one object of the present invention to provide a disk drive with a high shock resistivity, i.e., a disk drive equipped with an actuator lock structure and method which is able to resist a large shock, especially those applied for a short period of time, and rotational shocks.

It is another object of the present invention to provide a small-sized and lightweight lock mechanism which does not generate dust.

Briefly, in a preferred embodiment, the present invention comprises a disk drive system comprising: a disk recording medium; an actuator for movement over the surface of the disk recording medium; a lock device vertically movable for locking said actuator when located in an upward position or for releasing said actuator when located in a downward position; a first magnetic-field supply for latching said lock device to the lower position by a first magnetic force; a second magnetic-field supply for latching said lock device to the upper position by a second magnetic force; and a magnetic device for generating such a magnetic force as to move said lock device to the upper position when a first current is supplied or as to move said lock device to the lower position when the second current different from said first current is supplied.

The lock device contains a spring having elasticity and is fixed to the upper position by the action of a bias force of said spring and a magnetic force of said second magnetic-field supply.

Another invention provides an actuator locking method comprising the steps of: employing an actuator for movement over the surface of a disk recording medium; employing a lock device vertically movable for locking or releasing said actuator; latching said lock device to the lower position with a first magnetic force; moving the actuator to a predetermined lock position; generating a magnetic force larger than and opposite in direction to said first magnetic force by supplying a first current to move the lock device to the upper position; locking said actuator by latching said lock device to the upper position with a second magnetic force; and generating a magnetic force larger than and opposite in direction to said second magnetic force by supplying a second current different from the first current to move the lock device to the lower position, thereby releasing said actuator.

Yet another invention provides an actuator locking method comprising the steps of: employing an actuator for movement over the surface of a disk recording medium; employing a lock device vertically movable and containing a spring having elasticity for locking or releasing said actuator; latching said lock device to the lower position with a first magnetic downward force larger than the upward bias force of the spring; moving said actuator to a predetermined lock position; generating a magnetic upward force larger than the difference in strength between a first magnetic force and the bias force of the spring by supplying a first current to move the lock device to the upper position; locking the actuator by latching the lock device to the upper position with an upward bias force of said spring; and generating a magnetic downward force larger than the bias force of the spring by supplying a second current different from the first current to move said lock device to the lower position, thereby releasing said actuator.

Preferably, the above configurations further comprise the step of locking said actuator by applying a magnetic force in the direction parallel to the surface of a disk recording medium.

For a fuller understanding of the nature and advantages of the present invention, reference should be made to the following detailed description taken in conjunction with the accompanying drawings.

DESCRIPTION OF THE PREFERRED EMBODIMENTS

Figure 1:
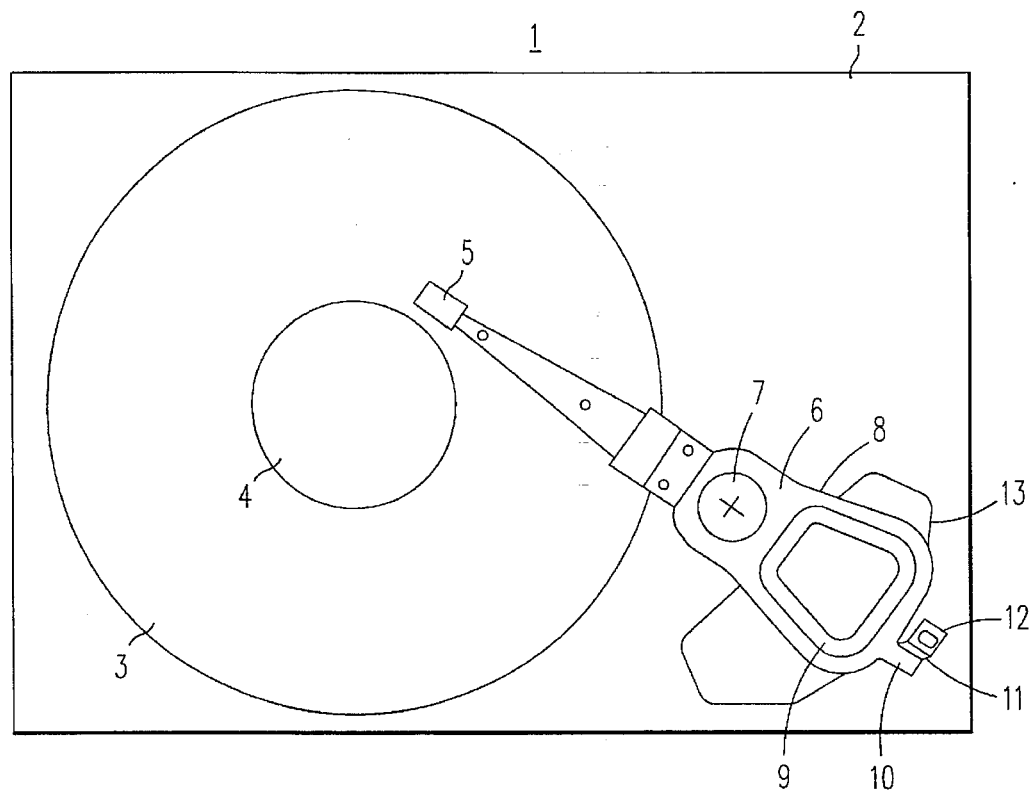
FIG. 1 is a plan view illustrating the magnetic disk drive according to one embodiment of the present invention.

FIG. 1 is a plan view of a magnetic disk drive according to one embodiment of the present invention. The magnetic disk drive 1 comprises: a magnetic disk recording medium 3 stored in a housing 2; a spin motor 4 for rotating the recording medium 3; and an actuator 6 for positioning the transducer head 5 to a predetermined position over the disk recording medium 3. The actuator 6 is a rotary type voice coil motor (VCM) and has an actuator arm 8 attached rotatably around the rotational axis 7. On one end of the actuator arm 8, a transducer head 5 is attached and a coil 9 is attached to the other end. The actuator arm 8 is made of aluminum and a iron piece 11 is attached to a protrusion 10 integrated on the other end. A permanent magnet 12 is attached to the housing 2 opposite to the iron piece 11. A permanent magnet 13 of VCM is provided on housing 2 within the traveling limits of the coil 9 on the actuator 6 and interacts with the coil 9 to rotate the actuator arm 8 around the rotational axis 7.

When the rotation of the magnetic disk 3 in the magnetic disk drive 1 stops, the actuator arm 8 is moved to the parking zone provided on the side of inner circumference. Then, since the iron piece 11 is attracted to the magnet 12, the actuator arm 8 moves toward the inner circumference of the recording medium 3 and is fixed. That is, the magnet 12 applies a magnetic force in a direction parallel to the surface of the recording medium 3 (horizontal direction) to lock the actuator arm 8.

Though not shown in the Figure, a lock device and a solenoid coil are provided in the magnetic disk drive 1. This lock device is movable in a different direction from the surface of the recording medium 3, that is in a direction perpendicular to the surface of recording medium 3 (vertical direction), and is provided for locking or releasing said actuator. The solenoid coil is so constructed that the lock device is moved upward or downward by the action of an electromagnetic force generated on applying a current to the solenoid coil. When the actuator arm 8 moves to the parking zone, this lock device moves to the upper position with the aid of the solenoid coil and is engaged with the actuator arm 8, so the arm 8 is fixed.

Under these circumstances, even when a large shock is applied for a short while from outside or a shock is rotational, the actuator arm 8 can be effectively fixed. That is, the actuator is locked not only in the parallel direction (horizontal direction) to the surface of the recording medium 3 but also in a direction perpendicular to the surface of the recording medium 3 (vertical direction) and consequently it has high shock resistance to vertical or a rotational shock. Thus, data in the data zone on the recording medium 3 is protected from an unexpected movement of the actuator arm 8. This point will be further explained hereinafter.

FIGS. 2 to 5 are enlarged side views of the actuator portion in one embodiment of the present invention. The actuator 21 is moved by means of the VCM magnet 22 and two sheets of upper and lower VCM yokes 23, 24. A plate spring 25 having an elasticity is so provided as to be engaged with this actuator in the upper and lower positions when the actuator 21 is positioned at the parking zone. The plate spring 25 is biased in an upward direction and moves vertically corresponding to the movement of an iron plunger 26. Below the iron plunger 26, a magnet 27 is provided as a first magnetic-field supply having a first magnetic force and a VCM yoke 23 is provided there above as a second magnetic-field supply having a second magnetic force. The magnet 27 fixes the plate spring 25 to the lower position by the action of a first magnetic field, that is, has a larger magnetic force downward than the upward bias force of the plate spring 25. On the other hand, the VCM yoke 23 fixes the plate spring 25 to the upper position by the action of a second magnetic force. For this fixation, use is made not only of the magnetic force of the VCM yoke 23 but also of the bias force of the plate spring 25. In addition, a solenoid coil 28 is also provided and a magnetic field generated by a current applied thereto will move the plate spring 25 vertically via the plunger 26.

When a first current is supplied, the solenoid coil 28 generates such a magnetic force as to push up the plunger 26, thereby moving the plate spring 25 to the upper position, and it generates such a magnetic force as to push down the plunger 26 when a second current different from the first is supplied, thereby moving the plate spring 25 to the lower position.

Next, the actuator locking method will be described.

Figure 2:
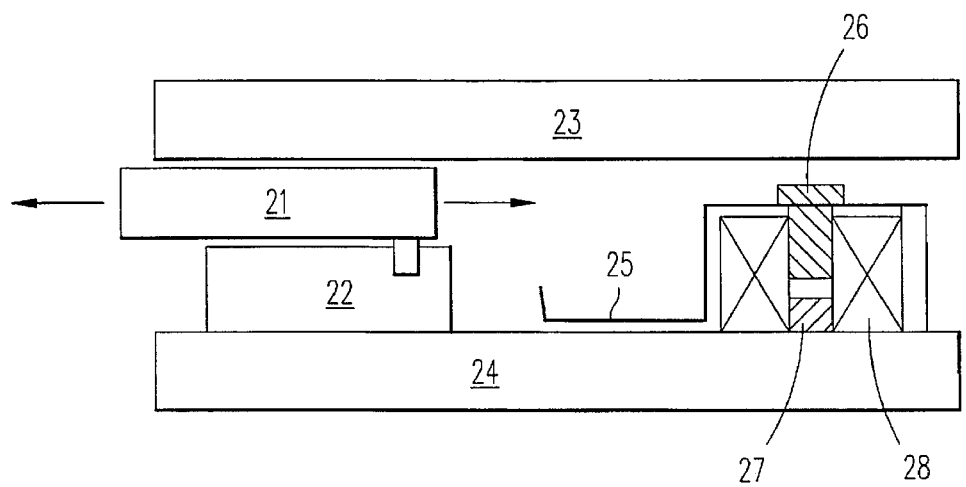
FIG. 2 is a side view illustrating the lock releasing mode.

FIG. 2 is a side view illustrating the lock releasing mode. The plunger 26 is attracted toward the magnet 27 by the action of a first magnetic force of the magnet 27. Since the plate spring 25 is pressed down with the aid of the plunger 26, the plate spring 25 is fixed at a low enough height such that it does not interfere with the movement of the actuator 21. During this mode, no current flows through the solenoid coil 28.

Figure 3:
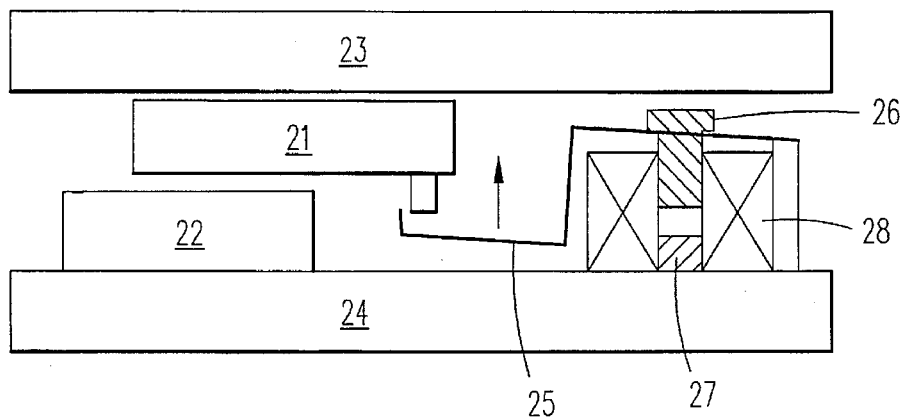
FIG. 3 is a side view illustrating the transient mode of transit from the lock releasing mode to the lock mode.

FIG. 3 is a side view illustrating the transient mode of transit from the lock release mode to the lock mode. The actuator 21 is moved to a predetermined lock position. Then a first current is supplied to the solenoid coil 28 so as to generate an upward magnetic force larger than the difference in strength between the first magnetic force of the magnet 27 and the bias force of the spring. On applying the first current so as to cancel the force of the magnet 27, the plate spring 25 moves to a height which is high enough to lock the actuator 21.

Figure 4:
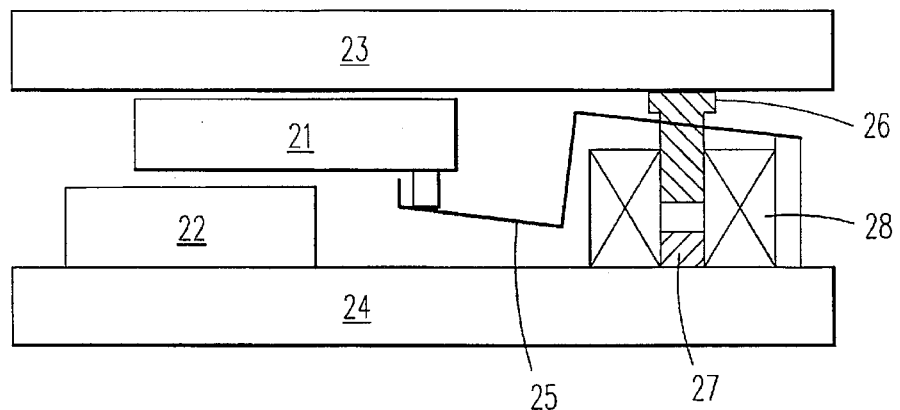
FIG. 4 is a side view illustrating the lock mode.

FIG. 4 is a side view illustrating the lock mode. The actuator 21 is caught on the plate spring 25 and cannot move toward the data zone. In the opposite direction, it is only allowed to move to a predetermined position with the aid of a stopper (Crash Stop). At this time, the upward bias force of the plate spring 25 and a second magnetic force of the VCM yoke 23 are set to a value large enough to endure a shock applied during carrying of a unit. In this way, the plate spring 25 is latched to the upper position. Incidentally, no current is applied to the solenoid coil 28 during this mode.

Figure 5:
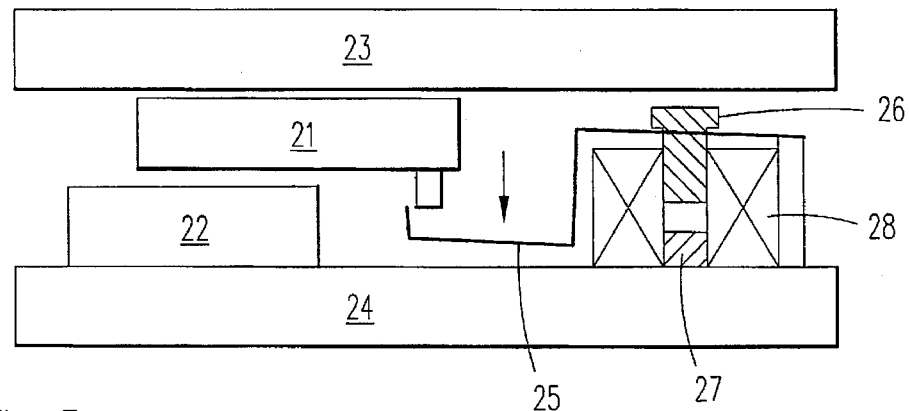
FIG. 5 is a side view illustrating the transient mode of transit from the lock mode to the lock releasing mode.

FIG. 5 is a side view illustrating the transient mode of transit from the lock mode to the lock releasing mode. By supplying a second current different from the first current to the solenoid coil 28, a magnetic force is generated which is larger than the sum of the bias force of the plate spring 25 and the second magnetic force of the VCM yoke 23 and opposite in direction to the second magnetic force and the bias force to move the plate spring 25 to the lower position, thereby releasing the actuator.

The use of a lightweight plate spring enables the present embodiment to effectively lock an actuator even when a short duration large shock is applied. That is, if a strong external shock is applied to the drive during transport of the drive, the actuator is likely to move, because of its heavy weight, if it is fixed only in the horizontal direction with the interaction between the iron piece 11 and the magnet 12. Using the lightweight and small-sized plate spring, which is resistant to vertical shocks, the present embodiment can securely lock the actuator with the aid of a small-sized lock.

The above embodiment employs an elastic plate spring as a lock device, however, the lock device is not limited to a plate spring but may be replaced by any other elastic parts and biasing devices.

Here, in a transient mode of transit from the lock releasing mode to the lock mode (of FIG. 3), a first solenoid coil force is generated which is larger than a first magnetic force generated the magnet 27 and opposite in direction to the first magnetic force, thereby moving the lock means to the upper position.

In the lock mode (of FIG. 4), the lock device is latched to the upper position by the action of a second magnetic force generated with the VCM yoke.

In a transit mode of transit from the lock mode to the lock releasing mode (of FIG. 5), supplying a second solenoid coil force different from a first solenoid force to the solenoid coil 28 generates a force larger than and opposite in direction to a second magnetic force and so moves the lock means to the lower position, thereby releasing the actuator 21.

The locking device uses a magnetic mechanism in which dust and any other wastes is unlikely to be generated. The present invention is thus especially effective in an sealed unit, such as magnetic disk unit, in which the mixing of dust and any other wastes into the unit should be avoided.

Also, during the lock mode and lock releasing mode, the present embodiment requires no drive current to be applied to the solenoid coil but requires a drive current only during a transient mode of changing between the modes. Thus, during operation or during nonoperation such as during transportation of the drive, the present embodiment also has the advantage that there is no need for current.

The present embodiment employs the upper VCM yoke as a magnetic-field supply but may employ the lower one also, thereby eliminating the need for a magnet 27 and thereby has another advantage in permitting the downsizing of the lock mechanism. Alternatively, the respective magnets can be provided in place of the upper and lower VCM yokes.

In the above embodiment, the reason for locking the actuator to the upper position by using not only an elastic plate spring but also a VCM yoke is that a large shock is likely to be applied from outside during transportation or during nonoperation of the drive and the lock device should be latched more securely. Thus, eliminating the VCM yoke force magnet upward force, it is still possible to lock the actuator with only the bias force of a high-elasticity plate spring.

In this way, because of using the lock mechanism in the horizontal and vertical directions relative to the recording medium, the present invention can obtain a high shock resistance for a rotational shock and a short duration large shock. Also, the simple design of the vertical latch reduces the possibility of dust and any other wastes being generated inside the unit and therefore can secure a high reliability also in such a unit as a highly sealed magnetic disc drive.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A disk drive system comprising:

a disk recording medium;

a transducer located proximate the disk recording medium;

an actuator for moving the transducer across the surface of the disk recording medium, said actuator including an arm assembly extending from a pivot axis and a rearward section extending from said pivot axis opposite the arm assembly, said rearward section being supported at said pivot axis for pivotal movement between an upper and lower yoke of a vcm assembly;

a lock device located between said upper and lower yokes of said vcm assembly, said lock device movable along a lock axis substantially perpendicular to the surface of the disk recording medium, for releasing said actuator when located at a first position along the lock axis and for locking said actuator when located at a second position along the lock axis;

a first magnetic-field supply for latching said lock device to the first position by the action of a first magnetic force;

a second magnetic-field supply for latching said lock device to the second position by the action of a second magnetic force; and a lock device motor for moving said lock device between the first and second positions.

2. The system of claim 1, wherein said lock device contains a bias member and is held in the second position by the action of a bias force of said bias member and a magnetic force of said second magnetic field supply.

3. The system of claim 1, further comprising:

a device for providing a magnetic force in a direction parallel to the surface of said disk recording medium, thereby preventing said actuator from moving.

4. The system of claim 1, wherein said first magnetic-field supply is a voice coil motor.

5. An actuator locking method comprising the steps of:

employing an actuator for moving a transducer across the surface of a disk recording medium, said actuator including an arm assembly extending from a pivot axis and a rearward section extending from said pivot axis opposite the arm assembly, said rearward section being supported at said pivot axis for pivotal movement between an upper and lower yoke of a vcm assembly;

employing a locking device located between said upper and lower yoke of said vcm assembly and movable along a lock axis substantially perpendicular to the surface of the disk recording medium for locking and releasing said actuator;

latching said lock device to the first position by the aid of a first magnetic force;

moving said actuator to a predetermined position;

generating a magnetic force larger than and opposite in direction to said first magnetic force to move said lock device to a second position;

locking said actuator by latching said lock device to the second position by the action of a second magnetic force; and generating a magnetic force larger than and opposite in direction to said second magnetic force to move said lock device to the first position, thereby releasing said actuator.

6. An actuator locking method comprising the steps of:

employing an actuator for moving a transducer across the surface of a disk recording medium said actuator including an arm assembly extending from a pivot axis and a rearward section extending from said pivot axis opposite the arm assembly, said rearward section being supported at said pivot axis for pivotal movement between an upper and lower yoke of a vcm assembly;

employing a locking device located between said upper and lower yoke of said vcm assembly and which contains a bias member having elasticity and which is movable along a lock axis substantially perpendicular to the surface of the disk recording medium, for latching and releasing said actuator;

moving said lock device to a first position with a first magnetic force larger than the bias force of said bias member in a first direction;

moving said actuator to a predetermined lock position;

generating a force larger than the difference between said first magnetic force and the bias force of said bias member to move said lock device to a second position;

locking said actuator by latching said lock device to the second position by the action of the bias force of said bias member; and generating a force larger than the bias force of said bias member to move said lock device to the first position, thereby releasing said actuator.

7. The method of claim 6, further comprising the steps of:

locking said actuator by applying a magnetic force in a direction parallel to the surface of said disk recording medium.

* * * * *